United States Patent [19]

Huignard et al.

[11] Patent Number: 4,877,312

[45] Date of Patent: Oct. 31, 1989

[54] BISTABLE OPTICAL PHOTOREFRACTIVE CRYSTAL DEVICE

[75] Inventors: Jean P. Huignard, Paris; Jean P. Herriau, Bures Sur Yvette, both of France

[73] Assignee: Thomson-CSF, Paris, France

[21] Appl. No.: 130,176

[22] Filed: Dec. 8, 1987

[30] Foreign Application Priority Data

Dec. 9, 1986 [FR] France ............................. 86 17208

[51] Int. Cl.$^4$ .............................................. G02F 1/01
[52] U.S. Cl. .................................................. 350/354
[58] Field of Search .................. 350/354, 353; 372/21, 372/22

[56] References Cited

U.S. PATENT DOCUMENTS

| | | | |
|---|---|---|---|
| 4,508,431 | 4/1985 | Henshaw | 350/354 |
| 4,543,662 | 9/1985 | Huignard | 350/3.62 X |
| 4,558,923 | 12/1985 | Hoffman et al. | 350/354 |
| 4,573,767 | 3/1986 | Jewell | 350/354 |
| 4,585,301 | 4/1986 | Bialkowski | 350/354 X |

FOREIGN PATENT DOCUMENTS 8603845 7/1986 World Int. Prop. O. .

OTHER PUBLICATIONS

Tarng et al., "External off and on switching of a bistable optical device", *Applied Physics Letters*, 40(3), Feb. 1, 1982, pp. 205–207.
Applied Physics Letters, vol. 44, No. 2, 15 Jan. 1984, pp. 172–174, American Institute of Physics, New York, US: J. L. Jewell et al: "Use of a Single nonlinear Fabry–Perot etalon as optical logic gates", p. 182.
IBM Technical Disclosure Bulletin, vol. 9, No. 12, May 1967, p. 1759, New York, US; R. W. Landauer: "Optical traveling-wave amplifier".
Revue De Physique Appliquee, vol. 19, No. 2, Feb. 1984, pp. 77–80, Orsay, FR; S. Laval: "La bistabilite optique", p. 80.
Applied Optics, vol. 25, No. 10, May 1986, pp. 1579, 1585, The Optical Society of America, New York, US; A. C. Walker: "Application of bistable optical logic gate arrays to all-optical digital parallel processing", pp. 1579–1580.
IEEE Journal of Quantum Electronics, vol. QE-21, No. 9, Sep. 1985, pp. 1348–1351, IEEE, New York, US: R. S. Jameson et al.: "Logic operations using a bistable etalon with two control beams", p. 1350.

*Primary Examiner*—Eugene R. LaRoche
*Assistant Examiner*—Nathan W. McCutcheon
*Attorney, Agent, or Firm*—Oblon, Spivak, McClelland, Maier & Neustadt

[57] ABSTRACT

An optical bistable photorefractive crystal device is provided in which a photorefractive crystal disposed between two mirrors is uniformly illuminated by a light beam, a signal beam being focused on a given portion of the crystal to cause bistable switching of this portion inside the crystal.

5 Claims, 3 Drawing Sheets

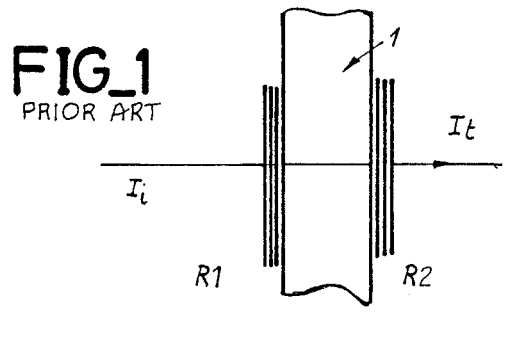
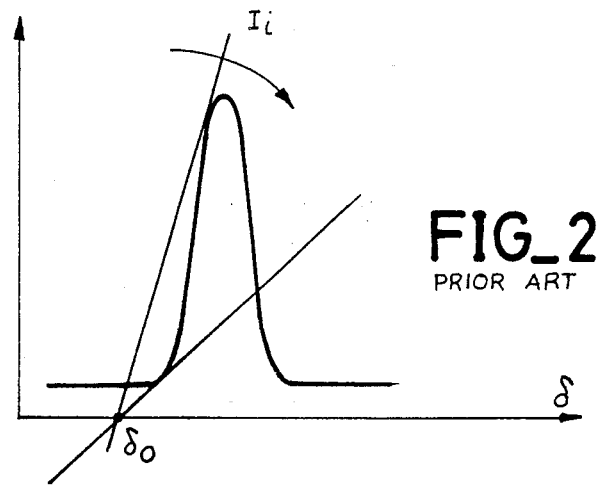
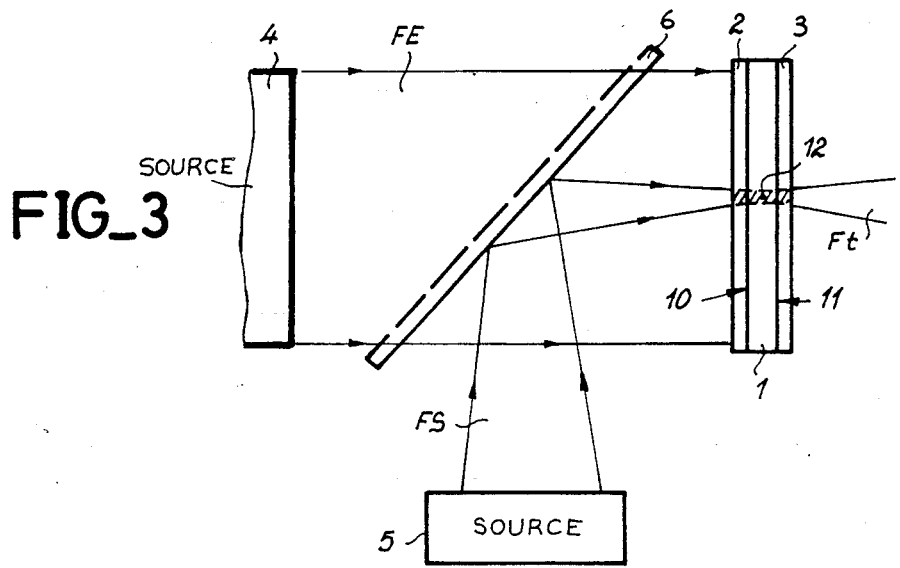

FIG_4
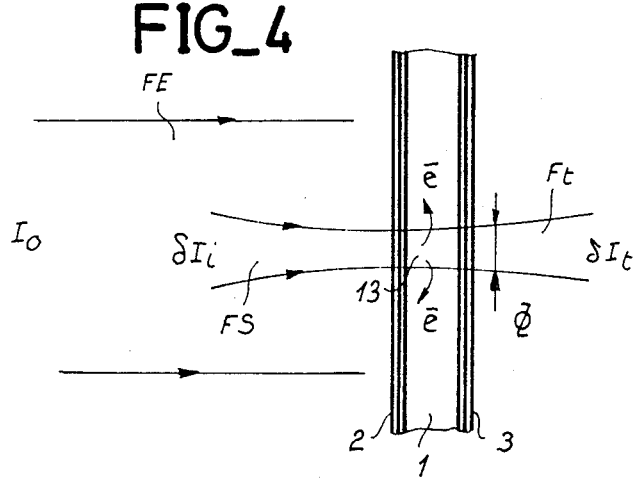
FIG_5
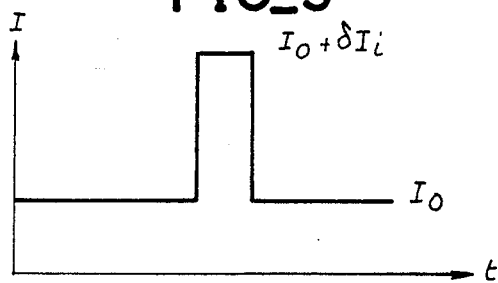
FIG_6
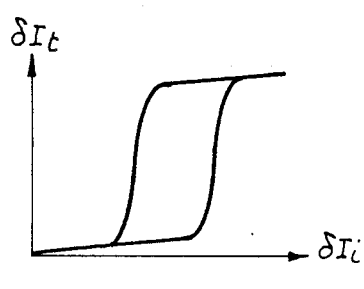
FIG_7
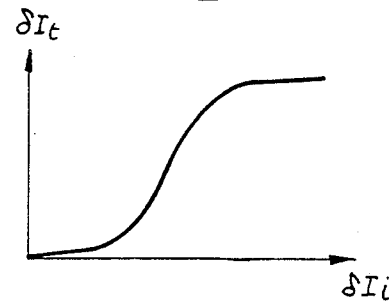

FIG_8
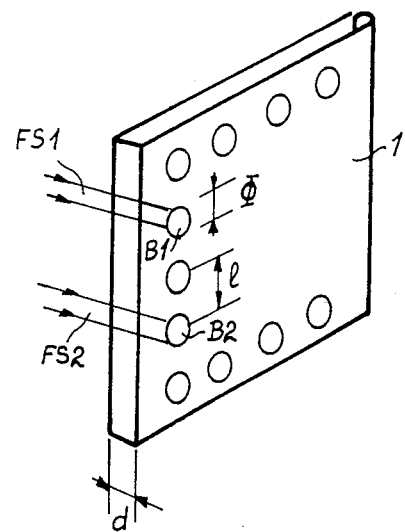
FIG_9
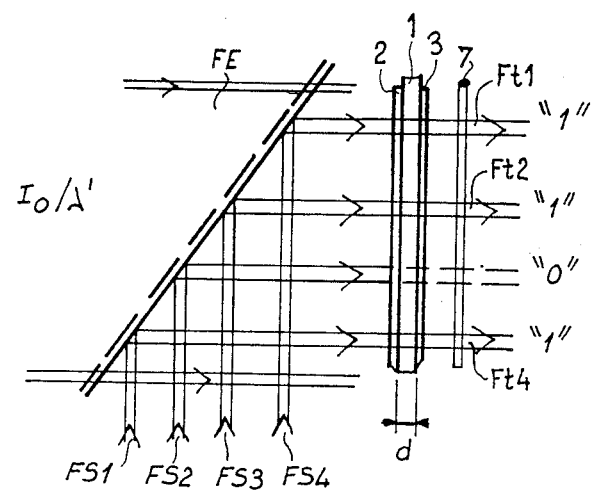

BISTABLE OPTICAL PHOTOREFRACTIVE CRYSTAL DEVICE

BACKGROUND OF THE INVENTION

The invention relates to a bistable optical device using a photorefractive crystal and based on the index variations induced in this photorefractive crystal. The invention also applies to a bistable matrix for providing, in parallel logic functions between optical beams.

An optical bistable element is characterized by the existence of two stable states of the transmitted intensity corresponding to the same value of the incident intensity. An optical bistable element is generally formed by a non linear medium placed inside a Fabry-Perot resonating cavity. By varying the intensity of the incident signal beam, the index of the non linear medium is modified and consequently the resonating cavity is detuned. Under these conditions, two stable values of the transmitted (or reflected) intensity can be obtained as well as a non linear characteristic of the transmitted intensity as a function of the incident intensity. Thus a function is obtained similar to that of an electronic transistor and which may be termed optical transistor. The description of such a device can be found in the article "Premiers pas du transistor optique" by Patricia PINEAU published in the review "La Recherche" n° 114 of September 1980.

FIG. 1 shows such a device in a simplified way and includes a non linear medium enclosed by reflection devices R1 and R2. This device receives a wave of intensity Ii and transmits a wave of intensity It.

Such devices have already been shown in the laboratory using the following non linear media:
Kerr optical effect in liquids,
excitonic resonance in super network semiconductors,
saturated absorption in gases.

It is now well known that the operating points of a device are obtained by intersection of the resonance curve of the Fabry-Perot cavity with a straight line turning about a fixed point and whose slope depends on the incident intensity (FIG. 2). Depending on the position of the operating point, a hysteresis cycle or a non linear characteristic may be obtained between the transmitted intensity and the incident intensity.

The invention relates to a type of bistable element based on the index variations induced by photorefractive effect in electro-optical crystals.

SUMMARY OF THE INVENTION

The invention relates then to a bistable photorefractive crystal device including:
a photorefractive crystal with a first and a second face;
a first mirror applied to the first face;
a second mirror applied to the second face;
a first light source which emits a light beam illuminating the first face uniformly with a given intensity through the first mirror;
at least a second light source which emits a control signal beam of given intensity, also illuminating the first face through the first mirror and focused on a given portion of the photorefractive crystal so as to cause bistable switching of this photorefractive crystal portion.

BRIEF DESCRIPTION OF THE DRAWINGS

The different objects and features of the invention will be more clearly understood from the following description given by way of example with reference to the accompanying FIGURES which show:
FIG. 1, a device of the prior art;
FIG. 2, operating curves of the device of FIG. 1,
FIG. 3, an example of a construction of the bistable optical device of the invention,
FIG. 4, a diagram for explaining the device of FIG. 3;
FIGS. 5 to 7, curves illustrating the operation of the device of the invention;
FIG. 8, an optical bistable matrix in accordance with the invention; and
FIG. 9, a device of the invention incorporating the matrix of FIG. 8.

DETAILED DESCRIPTION OF THE INVENTION

The change of index induced by photorefractive effect originates in the creation of a space charge field under local illumination of the electro-optical crystal. The photocarriers generated under illumination are retrapped after being transported through the volume of the crystal and the field created by this displacement of charges modulates the index of the crystal by linear electro-optical effect. This effect is revealed in all electro-optical materials ($LiNbO_3$, $BaTiO_3$, BSO, GaAs ...).

The amplitude of the effect as well as the time constant depend on the intrinsic properties of each crystal (for example, electro-optical coefficient, trap density ...). Very low writing energies are used at the present time with photoconducting crystals GaAs, InP, BGO ... (writing energy of an elementary network very little different from 50 to 100 $\mu J.cm^{-2}$; $\lambda = 1.3 \mu m$ for GaAs—$\mu = 0.514 \lambda m$ for BSO). With respect to the non linear media already mentioned, the photorefractive effects are characterized by the following properties:
memorization in the dark of the photoinduced index variation;
time constant for establishing the index variation controlled by the relatively low incident intensity on the crystal;
photoinduced dynamic index variation proportional to the modulation rate of the intensity received (for any other non liner medium n is proportional to the intensity).

The device of the invention makes use of these advantages to provide a bistable device such as shown in FIG. 3. This device has a flat shaped photorefractive crystal 1. To one of the faces 10 of this crystal is applied a first dielectric mirror 2 and to the opposite face 11 is applied a second dielectric mirror 3. These mirrors may be formed by layers of a dielectric material deposited on faces 10 and 11. The reflection coefficient of these mirrors is high, of the order of 0.95. The photorefractive crystal 1 and mirror 2 and 3 assembly forms a high speed Fabry-Perot device.

A light source 4 emits an illumination beam FE of intensity Io and, through a semireflecting mirror 6, uniformly illuminates mirror 2 which is sufficiently fine to let the whole of beam FE pass through into the photorefractive crystal 1. Beam FE may be coherent or incoherent and does not induce an index change by electro-optical effect.

Another light source 5 emits a control signal beam FS of intensity $dI_i$ towards a semireflecting mirror 6 which reflects it towards a photorefractive crystal.

Thus a combination of beams FE and FS is obtained as shown in FIG. 4.

Let $d\sigma$ be the phase shift of the signal wave after having passed through the Fabry-Perot standard. We have the following relationships:

$$dI_t = dI_i \frac{1}{1 + \frac{4R}{(1+R)^2} \sin^2 dp} \quad (1)$$

$$dn = dn_0 + C \frac{dI_t}{I_0} \quad (2)$$

The relationship (2) represents the index variation induced by photorefractive effect under the action of the local intensity $I_0 + dI_i$. The constant of proportionality C depends on the properties of the crystal used and, in particular, on the maximum index variation which can be photoinduced in the electro-optical material.

In these relationships we have:
$dI_t$ = intensity of the light wave (beam Ft) at the output of the photorefractive crystal 1,
R = coefficient of reflection of mirrors 2 and 3,
$dn_o$ = index refraction of the photorefractive crystal when it is only illuminated by beam FE and in the absence of the control signal beam FS.

If the light beam FE permanently illuminates the photorefractive crystal 1 and if the control signal beam is transmitted in the form of pulses, we have the diagram shown in FIG. 5.

The operating points of the device are obtained by graphic solution from relationships 1 and 2 and an example of a hysteresis cycle between the transmitted intensity and the incident intensity is given in FIG. 6 and 7.

By way of example, the device of the invention can be formed using a gallium arsenide wafer provided with dielectric mirrors having a high coefficient of reflection ($R \approx 0.95$) and of a thickness $d = 500$ μm. The index variation which can be induced at saturation by photorefractive effect is of the order of $\Delta n_{sat} \approx 5 \times 10^{-5}$.

For the operating point shown in FIG. 2, switching of the hysteresis cycle will be obtained if the phase shift induced under the action of the signal beam $dI_i$ is equal to:

$d_{\sigma FP} \approx \eta(1-R)$ with $d_{\sigma FP}$ = Fabry-perot phase shift and R = coefficient of reflection of the mirrors;
namely $d_{\sigma FP} \approx \pi/20$ The phase shift corresponding to the index variation induced by photorefractive effect is written:

$$dp_{PR} = \frac{2\pi}{\lambda} \times d \times \Delta n_{sat}$$

with d = thickness of the photorefractive crystal wafer;
$\Delta n_{sat}$ = index variation which can be induced at saturation;

$\lambda = 1$ μm; $d = 500$ μm; $\Delta n_{sat} \approx 5 \times 10^{-5}$ $\delta p_{PR} \approx \frac{\pi}{20}$ The phase shift induced by photorefractive effect is therefore sufficient for switching the Fabry-Perot between two high and low transmission states.

The times for switching the photoinduced index variation correspond to the dielectric relaxation time constants of the photorefractive crystal under incident illumination.

$$\tau \approx \frac{\epsilon r \epsilon o}{\sigma(I)}$$

with $\epsilon o$ = dielectric permittivity of a vacuum
$\epsilon r$ = dielectrive permittivity of the crystal.

For gallium arsenide (GaAs), the law of variation of the conductivity is given by $\sigma(I) = 10^{-8} + 5 \cdot 10^{31} {}^{81} \cdot \Omega^{-1} cm^{-1}$;

I being expressed in $W \cdot cm^{-2}$.

The switching time for the bistable device corresponding to a control signal of intensity $dI_i$ very little different form 1mW and focused on a point of diameter 3μm is equal to:

$$\tau \approx \frac{\epsilon_o \epsilon_o}{(dI_i)}$$

For digital values of $\epsilon_r 26\ 46$ and $dI_i \approx 10^4 W \cdot cm^{-2}$
We have a switching time t of value $= t \approx 2 \times 10^{-9}$ second The device of the invention is applicable to a bistable element network.

As shown in FIG. 8, the photorefractive crystal wafer 1 may have dimensions such that it can distinctly receive several control signal beams such as FS1 and FS2. Each control signal beam defines a zone (B1, B2) each corresponding to a bistable element.

The photorefractive crystal wafer 1 may be used in a circuit similar to that shown in FIG. 3.

In FIG. 9 are shown the photorefractive material wafer 1 enclosed by mirrors 2 and 3, the semireflecting mirror 6, the illumination beam FE emitted by a light source 4 and uniformly illuminating wafer 1 with an intensity Io. On the other hand, instead of having only a single source emitting a control signal beam FS, we have several sources and several beams such as FS1 to FS4. These beams may be disposed in matrix form so as to control a bistable matrix such as shown in FIG. 8. For the sake of simplicity of representation, in FIG. 9 aligned beams FS1 to FS4 have been considered giving rise to beams FT1 to FT4.

Following the foregoing explanations, if the intensity of any beam, F53 for example, is less than a given threshold, the corresponding bistable (B3) of the photorefractive crystal 1 is in position 0 and no light signal (or signal "0") is emitted. The other signal beams (FS1, FS2, FS4) on the other hand cause the corresponding bistables (B1, b2, B4) to be placed in position 1 and beams Ft1 Ft2, Ft4 ("1" signals) are emitted.

A network of 32 bistables by 32 bistables based on the gallium arsenide photorefractive effect may be formed. Such a network may have the following characteristics:
dimension between points $1 \approx 100$μm
diameter of each point $\phi = 3$μm
thickness $d \approx 500$ μm
coefficient of reflection of the dielectric mirrors $R \approx 0.95$.

If the signal beam has for intensity $dI_i \approx 1mW$ at a wave length of $\lambda = 1.3\mu m$ (semiconductor laser) and if the uniform illuminating beam (coherent or incoherent) of the photorefractive crystal has for intensity:

$$I_o \approx 1W.cm^{-2}$$

the switching time for the bistable will be substantially $t = 2 \times 10^{-9}$ s.

The device provided forms a two dimensional bistable network controlled by a low intensity beam ($\delta I_i \approx 1mW$) for each point) and the switching time of which is of the order of a few nanoseconds. The applications of such a device relate more particularly to parallel digital optical computing.

The advantages presented by this device are the following:
- solid material not including any supernetwork structure,
- non resonating interaction operating over a wide wave length range,
- switching time of a few nanoseconds for a signal of 1mW.

The above description has of course been given solely by way of example. The numerical values in particular have only been given to illustrate the description. Other variants may be contemplated without departing from the scope or spirit of the invention.

What is claimed is:

1. An optical bistable photorefractive crystal device including:
   - a photorefractive crystal with a first and a second face;
   - a first mirror applied to the first face;
   - a second mirror applied to the second face;
   - a first light source which emits a light beam illuminating the first face uniformly with a given intensity through the first mirror;
   - at least a second light source which emits a control signal beam of given intensity, also illuminating the first face through the first mirror and focused on a given portion of the photorefractive crystal so as to cause bistable switching of this photorefractive crystal portion.

2. The optical bistable photorefractive crystal device as claimed in claim 1, including a semitransparent mirror receiving distinctly the illuminating beam and the control signal beam and combining them for transmitting them to the first face of the photorefractive crystal through the first mirror.

3. The optical bistable device as claimed in claim 1, wherein said first and second mirrors are dielectric mirrors whose coefficient of reflection is high.

4. The optical bistable device as claimed in claim 3, wherein said reflection coefficient is close to 0.95.

5. The optical bistable device as claimed in claim 1, wherein the intensity of said illuminating light beam is very low compared with the intensity of the control signal beam.

* * * * *